United States Patent
Kim et al.

(10) Patent No.: US 9,985,711 B2
(45) Date of Patent: May 29, 2018

(54) METHOD AND DEVICE FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/891,254

(22) PCT Filed: Aug. 4, 2014

(86) PCT No.: PCT/KR2014/007165
§ 371 (c)(1),
(2) Date: Nov. 13, 2015

(87) PCT Pub. No.: WO2015/020373
PCT Pub. Date: Feb. 12, 2015

(65) Prior Publication Data
US 2016/0080065 A1    Mar. 17, 2016

Related U.S. Application Data

(60) Provisional application No. 61/862,493, filed on Aug. 5, 2013.

(51) Int. Cl.
*H04B 7/216* (2006.01)
*H04B 7/06* (2006.01)
(Continued)

(52) U.S. Cl.
CPC ......... *H04B 7/0639* (2013.01); *H04B 7/0456* (2013.01); *H04B 7/063* (2013.01);
(Continued)

(58) Field of Classification Search
CPC .... H04B 7/0639; H04B 7/063; H04B 7/0626; H04B 7/0417; H04B 7/0456;
(Continued)

(56) References Cited

U.S. PATENT DOCUMENTS

| 9,143,212 B2* | 9/2015 | Chen | H04B 7/0486 |
| 2015/0023280 A1* | 1/2015 | Kim | H04B 7/04 370/329 |

(Continued)

OTHER PUBLICATIONS

PCT International Application No. PCT/KR2014/007165, Written Opinion of the International Searching Authority dated Nov. 19, 2014, 16 pages.

(Continued)

*Primary Examiner* — Hanh N Nguyen
(74) *Attorney, Agent, or Firm* — Lee Hong Degerman Kang & Waimey

(57) ABSTRACT

The present invention relates to a wireless communication system. A method for transmitting channel state information by a terminal in a wireless communication system according to an embodiment of the present invention includes the steps of: joint encoding a rank indicator (RI) and a first precoding matrix indicator (PMI) to a single encoded value, in a reporting mode for four antenna ports; and transmitting channel state information including the encoded value, wherein the encoded value is determined depending on a first table or a second table according to a maximum value of the RI, and an encoding value, which is identical to an encoding value according to the first table, among encoding values according to the second table, may have RI and first (Continued)

PMI identically corresponding to those of the encoding value according to the first table.

14 Claims, 13 Drawing Sheets

(51) Int. Cl.
  *H04B 7/0456* (2017.01)
  *H04L 5/14* (2006.01)
(52) U.S. Cl.
  CPC ........... *H04B 7/066* (2013.01); *H04B 7/0658* (2013.01); *H04L 5/14* (2013.01)
(58) Field of Classification Search
  CPC ..... H04W 72/04; H04W 24/08; H04W 52/42; H04L 1/00; H04L 25/03343; H04L 5/14
  See application file for complete search history.

(56) References Cited

U.S. PATENT DOCUMENTS

2016/0007339 A1* 1/2016 Kim ..................... H04B 7/0456
 370/329
2016/0080064 A1* 3/2016 Kim ..................... H04B 7/0456
 370/281

OTHER PUBLICATIONS

CATT, "Codebooks for 4 Tx rank 1-2 and its subsampling," 3GPP TSG RAN WG1 Meeting #73, R1-132848, May 2013, 5 pages.
Alcatel-Lucent Shanghai Bell, et al., "Proposals of enhanced 4Tx codebook and codebook subsampling," 3GPP TSG RAN WG1 Meeting #73, R1-132840, May 2013, 6 pages.
Texas Instruments, "Finalizing feedback channel of 4Tx," 3GPP TSG RAN WG1 #73, R1-131944, May 2013, 3 pages.
Ericsson, et al., "Evaluations of Codebook 2a and 2b," 3GPP TSG-RAN WG1 #73, R1-132827, May 2013, 5 pages.
Alcatel-Lucent Shanghai Bell, et al., "Details of CSI feedback modes for DL MIMO Enhancement," 3GPP TSG-RAN WG1 #73, R1-132049, May 2013, 3 pages.
PCT International Application No. PCT/KR2014/007165, Written Opinion of the International Searching Authority dated Nov. 19, 2014, 11 pages.

* cited by examiner (a) Control - Plane Protocol Stack (b) User - Plane Protocol Stack

| CQI Reporting Mode | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | UE-Selected (Subband CQI) | Mode 2-0 | Mode 2-1 |

(a)

(b)

(a)

(b)

METHOD AND DEVICE FOR TRANSMITTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/007165, filed on Aug. 4, 2014, which claims the benefit of U.S. Provisional Application No. 61/862,493, filed on Aug. 5, 2013, the contents of which are all hereby incorporated by reference herein in their entirety.

TECHNICAL FIELD

The present invention relates to a wireless communication system, and more particularly, to a method of transmitting channel state information using joint-encoding in a wireless communication system and an apparatus therefor.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

A MIMO (multiple input multiple output) technology corresponds to a method capable of enhancing data transmission and reception efficiency by selecting multiple transmission antennas and multiple reception antennas instead of a single transmission antenna and a single reception antenna. In particular, the MIMO technology corresponds to a technology for increasing capability and improving performance using multiple antennas used by a transmitting end or a receiving end of a wireless communication system. The MIMO technology can also be called a multi-antenna technology.

In order to support multi-antenna transmission, it may be able to apply a precoding matrix configured to appropriately distribute transmission information to each antenna according to a channel status and the like.

DISCLOSURE OF THE INVENTION

Technical Task

An object of the present invention devised to solve the problem lies in a method and device for reporting channel state information in a radio communication system.

It is to be understood that both the foregoing general description and the following detailed description of the present invention are exemplary and explanatory and are intended to provide further explanation of the invention as claimed.

Technical Solution

To achieve these and other advantages and in accordance with the purpose of the present invention, as embodied and broadly described, according to one embodiment, a method of transmitting channel state information, which is transmitted by a user equipment in a wireless communication system, includes the steps of joint encoding an RI (rank indicator) and a first PMI (precoding matrix indicator) with a single encoding value in a reporting mode for 4 antenna ports and transmitting the channel state information containing the encoding value. In this case, the encoding value is determined according to a first table or a second table depending on a maximum value of the RI and if a value of an encoding value according to the second table is identical to an encoding value according to the first table, the RI may identically correspond to the first PMI.

To further achieve these and other advantages and in accordance with the purpose of the present invention, according to a different embodiment, a user equipment transmitting channel state information in a wireless communication system includes an RF (radio frequency) unit and a processor, the processor configured to perform joint encoding on an RI (rank indicator) and a first PMI (precoding matrix indicator) with a single encoding value in a reporting mode for 4 antenna ports, the processor configured to transmit the channel state information containing the encoding value. In this case, the encoding value is determined according to a first table or a second table depending on a maximum value of the RI and if a value of an encoding value according to the second table is identical to an encoding value according to the first table, the RI may identically correspond to the first PMI.

Following items can be commonly applied to the various embodiments according to the present invention.

The maximum value of the RI may correspond to 2 in the first table and the maximum value of the RI may correspond to 4 in the second table.

If the RI corresponds to 1 and the first PMI corresponds to 0 to 7 in the first table, a value of the joint encoding can be determined by a value of the first PMI.

If the RI corresponds to 1 and the first PMI corresponds to 0 to 7 in the first table, a value of the joint encoding can be determined by a value obtained by adding 8 to a value of the first PMI.

If the RI corresponds to 1 and the first PMI corresponds to 0 to 7 in the second table, a value of the joint encoding can be determined by a value of the first PMI.

If the RI corresponds to 2 and the first PMI corresponds to 0 to 7 in the second table, a value of the joint encoding can be determined by a value obtained by adding 8 to a value of the first PMI.

If the RI corresponds to 1 and the first PMI corresponds to 8 to 15 in the second table, a value of the joint encoding can be determined by a value obtained by adding 8 to a value of the first PMI.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

The configuration, operation and other features of the present invention will be understood by the embodiments of the present invention described with reference to the accompanying drawings. The following embodiments are examples of applying the technical features of the present invention to a 3rd generation partnership project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
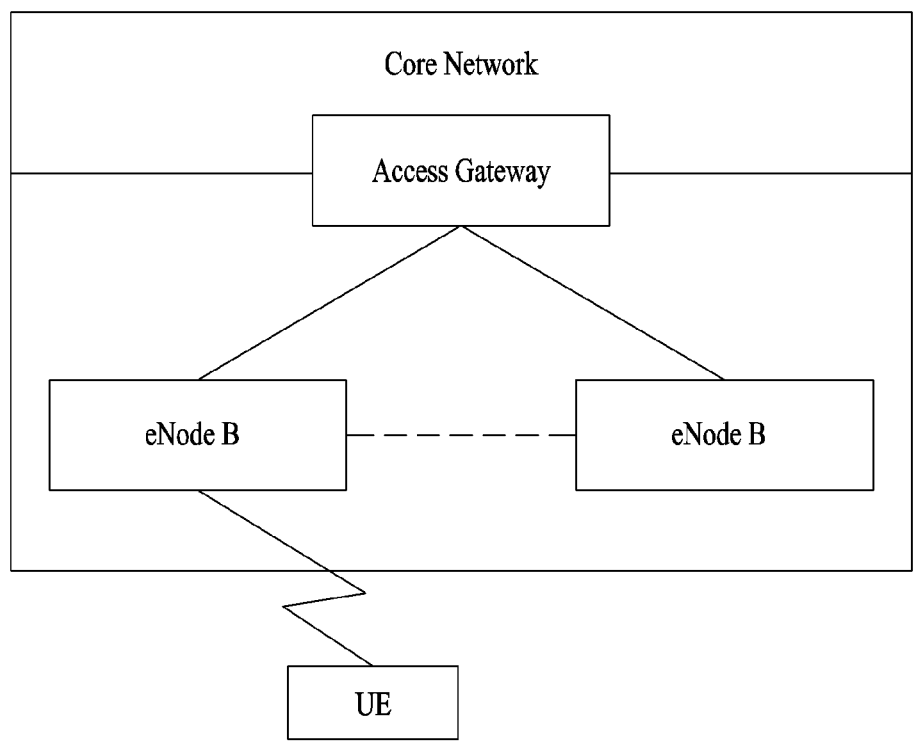
FIG. 1 is a diagram schematically showing a network structure of an evolved universal mobile telecommunications system (E-UMTS) as an exemplary radio communication system.
Figure 2:
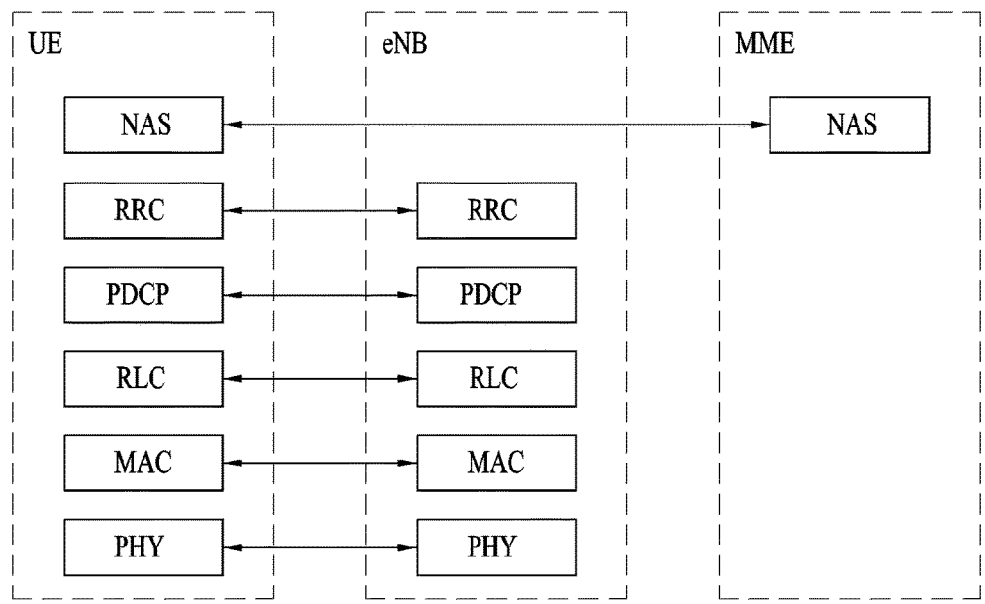
FIG. 2 is a diagram illustrating a control plane and a user plane of a radio interface protocol between a UE and an evolved universal terrestrial radio access network (E-UTRAN) based on a 3rd generation partnership project (3GPP) radio access network standard.
Figure 2:
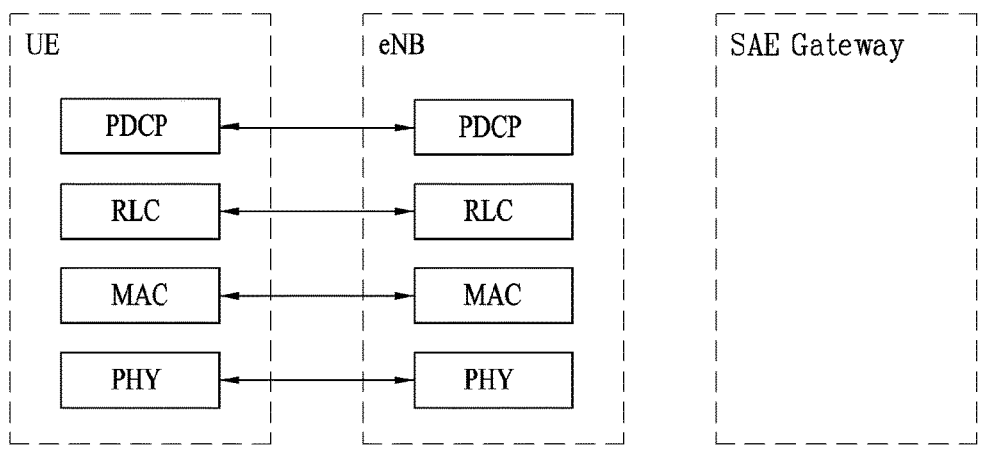

FIG. 2 is a diagram illustrating a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, reconfiguration, and release of radio bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
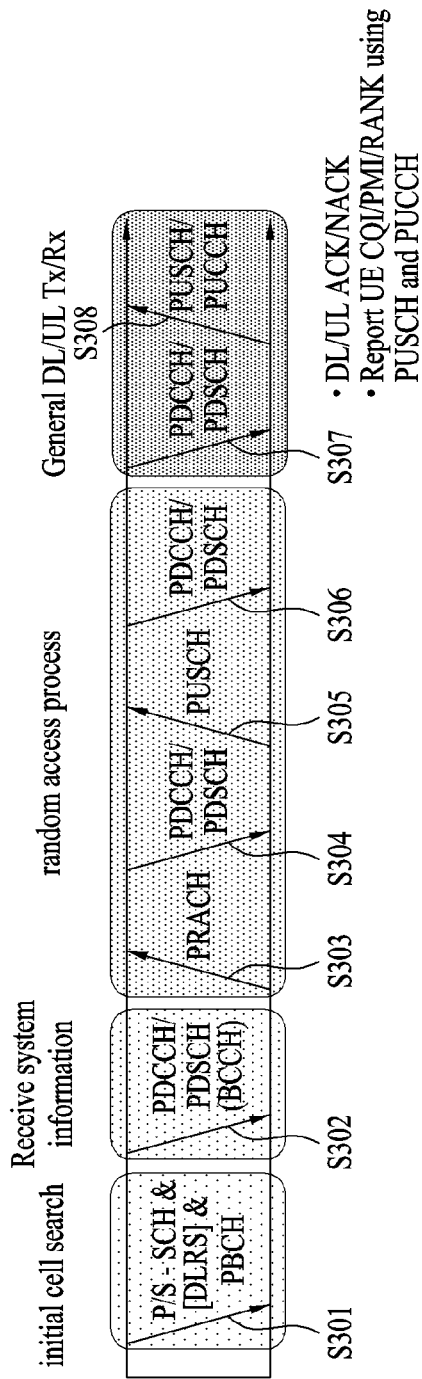
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. To this end, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) through the PDCCH. Here, the DCI contains control information such as resource allocation information about a UE and has different formats according to according to different usages of DCI.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
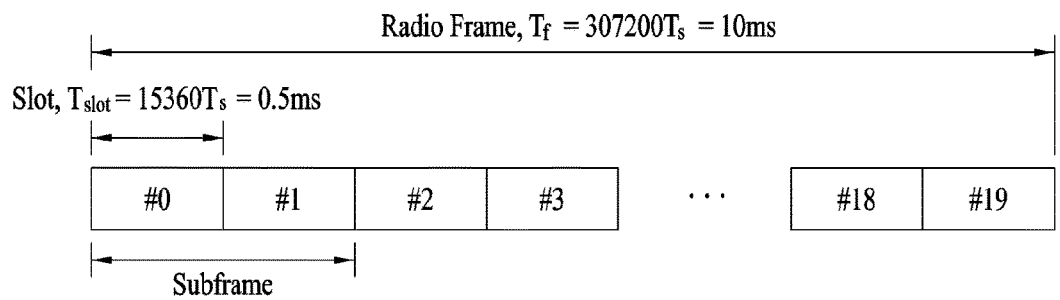
FIG. 4 is a diagram illustrating an example of the structure of a radio frame used in a long term evolution (LTE) system.

FIG. 4 is a diagram illustrating an example of the structure of a radio frame used in an LTE system.

Referring to FIG. 4, a radio frame has a length of 10 ms (327200×Ts) and includes ten subframes having an equal size. Each subframe has a length of 1 ms and includes two slots each having a length of 0.5 ms (15360×Ts). Here, Ts denotes a sampling time, which is represented as Tx=1/(15 kHz×2048)=3.2552×10−8 (approximately 33 ns). A slot includes a plurality of orthogonal frequency division multiplexing (OFDM) symbols in the time domain and a plurality of resource blocks in the frequency domain. In the LTE system, one resource block includes 12 subcarriers×7(6) OFDM symbols. A unit time for transmitting data, transmission time interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 5:
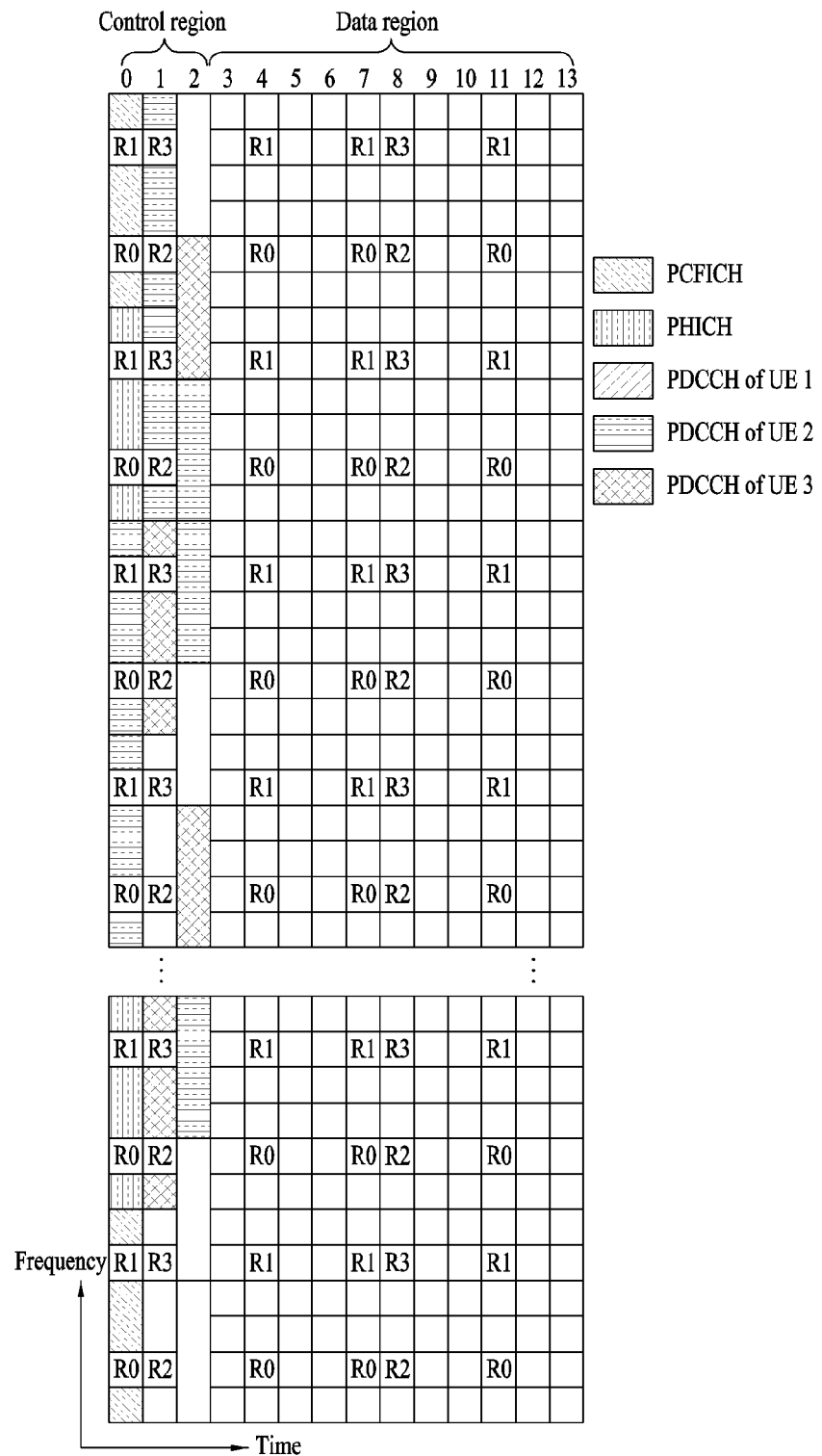
FIG. 5 is a diagram illustrating a control channel included in a control region of a subframe in a downlink radio frame.

FIG. 5 is a diagram illustrating a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a physical control format indicator channel (PCFICH), physical hybrid-arq indicator channel (PHICH), physical downlink control channel (PDCCH), etc.

The physical control format indicator channel (PCFICH) informs the UE of the number of OFDM symbols used for the PDCCH per subframe. The PCFICH is located at a first OFDM symbol and is set prior to the PHICH and the PDCCH. The PCFICH includes four resource element groups (REGs) and the REGs are dispersed in the control region based on a cell identity (ID). One REG includes four resource elements (REs). An RE indicates a minimum physical resource defined as one subcarrier×one OFDM symbol. The PCFICH has a value of 1 to 3 or 2 to 4 and is modulated using a quadrature phase shift keying (QPSK) scheme.

The physical Hybrid-ARQ indicator channel (PHICH) is used to transmit HARQ ACK/NACK for uplink transmission. That is, the PHICH refers to a channel in which DL ACK/NACK information for UL HARQ is transmitted. The PHICH includes one REG and is scrambled on a cell-specific basis. ACK/NACK is indicated by one bit and is modulated using binary phase shift keying (BPSK). The modulated ACK/NACK is spread with a spreading factor (SF) of 2 or 4. A plurality of PHICHs mapped to the same resource constitutes a PHICH group. The number of multiplexed PHICHs in the PHICH group is determined according to the number of SFs. The PHICH (group) is repeated through times in order to acquire diversity gain in the frequency domain and/or time domain.

The physical downlink control channel (PDCCH) is allocated to the first n OFDM symbols of a subframe. Here, n is an integer of 1 or more and is indicated by a PCFICH. The PDCCH includes one or more control channel elements (CCEs). The PDCCH informs each UE or a UE group of information associated with resource allocation of a paging channel (PCH) and a downlink-shared channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
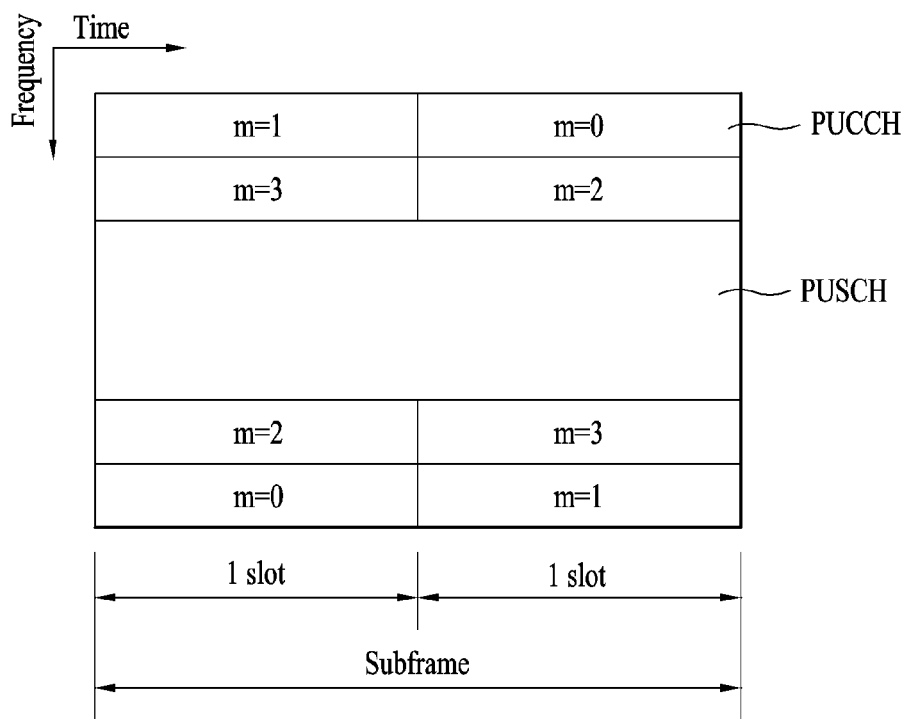
FIG. 6 is a diagram illustrating an uplink subframe structure used in an LTE system.

FIG. 6 is a diagram illustrating an uplink subframe structure used in an LTE system.

Referring to FIG. 6, a UL subframe may be divided into a region to which physical uplink control channel (PUCCH) for carrying control information is allocated and a region to which physical uplink shared channel (PUSCH) for carrying user data is allocated. The middle of the subframe is allocated to the PUSCH, while both sides of the data region in the frequency domain are allocated to the PUCCH. Control information transmitted on the PUCCH may include a Hybrid Automatic Repeat request acknowledgement/negative acknowledgement (HARQ ARCK/NACK), a Channel Quality Indicator (CQI) representing a downlink channel state, a rank indicator (RI) for multiple input multiple output (MIMO), a scheduling request (SR) requesting uplink resource allocation. A PUCCH for one UE uses one resource block that occupies different frequencies in slots in a subframe. That is, two resource blocks allocated to the PUCCH is frequency hopped at a slot boundary. In particular, PUCCHs with m=0, m=1, and m=2 are allocated to a subframe in FIG. 6.

Multiple Input Multiple Output (MIMO) System

Now a description will be given of a Multiple Input Multiple Output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
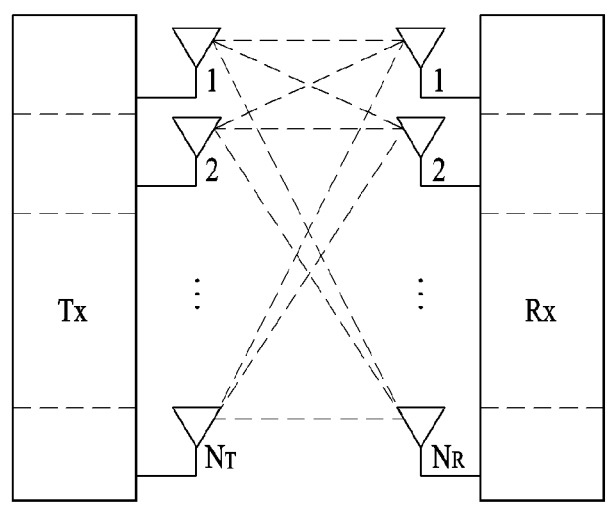
FIG. 7 illustrates the configuration of a typical multiple input multiple output (MIMO) communication system.

FIG. 7 illustrates the configuration of a typical MIMO communication system. Referring to FIG. 7, a transmitter has NT Tx antennas and a receiver has NR Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas. Ri is the smaller value between NT and NR.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas as illustrated in FIG. 7 will be described in detail through mathematical modeling. Regarding a transmission signal, up to NT pieces of information can be transmitted through the NT Tx antennas, as expressed as the vector shown in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below. Herein, $w_{ij}$ denotes a weight between a jth piece of information and an ith Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel State Information (CSI) Feedback

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as Equation 8 below may be used for hierarchical codebook transformation that configures one final PMI with W1 and W2.

$$W = \text{norm}(W1 W2) \quad \text{[Equation 8]}$$

In Equation 8 above, W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as Equation 9 below.

$$W1(i) = \begin{bmatrix} X_i & 0 \\ 0 & X_i \end{bmatrix}, \text{ where } X_i \text{ is } Nt/2 \text{ by M matrix} \quad \text{[Equation 9]}$$

$$W2(j) = \overbrace{\begin{bmatrix} e_M^k & e_M^l & e_M^m \\ & \cdots & \\ \alpha_j e_M^k & \beta_j e_M^l & \gamma_j e_M^m \end{bmatrix}}^{r \text{ columns}} \text{ (if rank = r),}$$

where $1 \leq k, l, m \leq M$ and $k, l, m$ are integer.

Here, Nt is the number of Tx antennas and M is the number of columns of a matrix Xi, which means that the matrix Xi has total M candidate column vectors. $e_M^k$, $e_M^l$, and $e_M^m$ are column vectors that have elements of 0 except for only kth, lth, and mth elements that are 1 among M elements and are kth, lth, and mth column vectors of Xi. $\alpha_j$, $\beta_j$, $\gamma_j$ are complex values and indicate that phase rotation is applied to the kth, lth, and mth column vectors of the matrix in order to choose these column vectors, respectively. i is an integer equal to or greater than 0 and is a PMI index indicating W1. j is an integer equal to or greater than 0 and is a PMI index indicating W2.

In Equation 9 above, the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as Equation 10 below.

$$W1(i) * W2(j) = \begin{bmatrix} X_i(k) \\ \alpha_j X_i(k) \end{bmatrix} \quad \text{[Equation 10]}$$

In [Equation 10], a codeword is expressed as $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a Discrete Fourier Transform (DFT) matrix may be used for $X_i(k)$.

As described above, CSI in an LTE system includes, but is not limited to, CQI, PMI, and RI. Some or all of CQI, PMI, and RI may be transmitted according to a transmission mode of a UE. A case in which CSI is periodically transmitted is referred to as periodic reporting and a case in which CSI is transmitted according to request of a BS is referred to as aperiodic reporting. In case of aperiodic reporting, a request bit contained in UL scheduling information from the BS is transmitted to the UE. Then, the UE transmits CSI obtained in consideration of a transmission mode of the UE to the BS via a UL data channel (PUSCH). In case of periodic reporting, periods, offset for a corresponding period, etc. are signaled in units of subframes via an upper layer signal for each respective UE in a semi-static manner. Each UE transmits CSI obtained in consideration of a transmission mode of the UE to the BS via a UL control channel (PUCCH) according to a predetermined period. When UL data and CSI are simultaneously present in a subframe for transmitting CSI, the CSI is transmitted through a UL data channel (PUSCH) together with the data. The BS transmits transmission timing information appropriate for each respective UE to the UE in consideration of a channel state of each UE, a distribution state of UEs in a cell, etc. The transmission timing information includes a period, offset, etc. for transmission of CSI and may be transmitted to each UE through an RRC message.

FIGS. 8 to 11 illustrate periodic reporting of CSI in LTE.

Figures 8, 9:
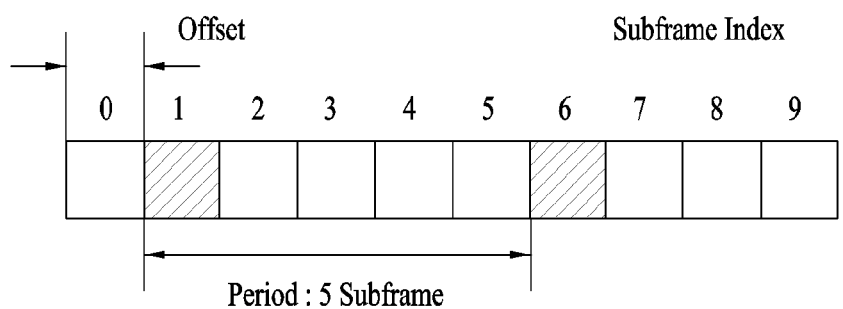
FIGS. 8 to 11 illustrate periodic reporting of channel state information (CSI)

Referring to FIG. 8, an LTE system has four CQI reporting modes. In detail, the CQI reporting mode is classified into WB CQI and SB CQI according to a CQI feedback type and is classified into no PMI and single PMI according to whether PMI is transmitted. Each UE receives information formed by combining a period and offset via RRC signaling in order to periodically report CQI.

FIG. 9 illustrates an example in which a UE transmits CSI when information indicating {period '5' and offset '1'} is signaled to the UE. Referring to FIG. 9, upon receiving the information indicating {period '5' and offset '1'}, the UE transmits CSI in units of 5 subframes with an offset of one subframe in a direction in which a subframe index increases from a 0th subframe. CSI. CSI is basically transmitted via a PUCCH. However, when PUSCH for transmission is present at the same time, CSI is transmitted together with data via PUSCH. A subframe index is formed by combining a system frame number (or a radio frame index)(nf) and a slot index (ns, 0 to 19). Since a subframe includes 2 slots, a subframe index may be defined according to 10*nf+floor (ns/2). floor( ) indicates a rounddown function.

There are a type for transmitting only WB CQI and a type for both WB CQI and SB CQI. In case of the type for transmitting only WB CQI, CQI information about an entire band in a subframe corresponding to every CQI transmission period is transmitted. As illustrated in FIG. 8, when PMI needs to be also transmitted according to a PMI feedback type, PMI information is transmitted together with CQI information. In case of the type for transmitting both WB CQI and SB CQI, WB CQI and SB CQI are alternately transmitted.

Figure 10:
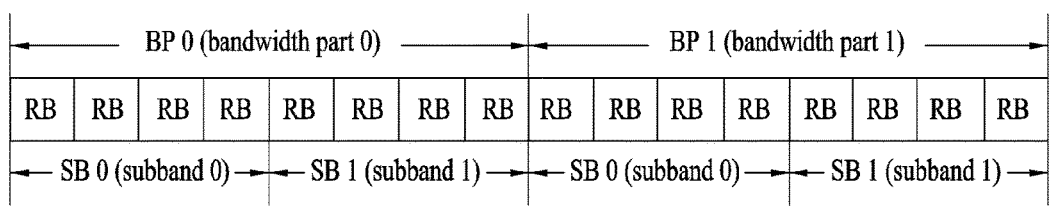
Figure 11:
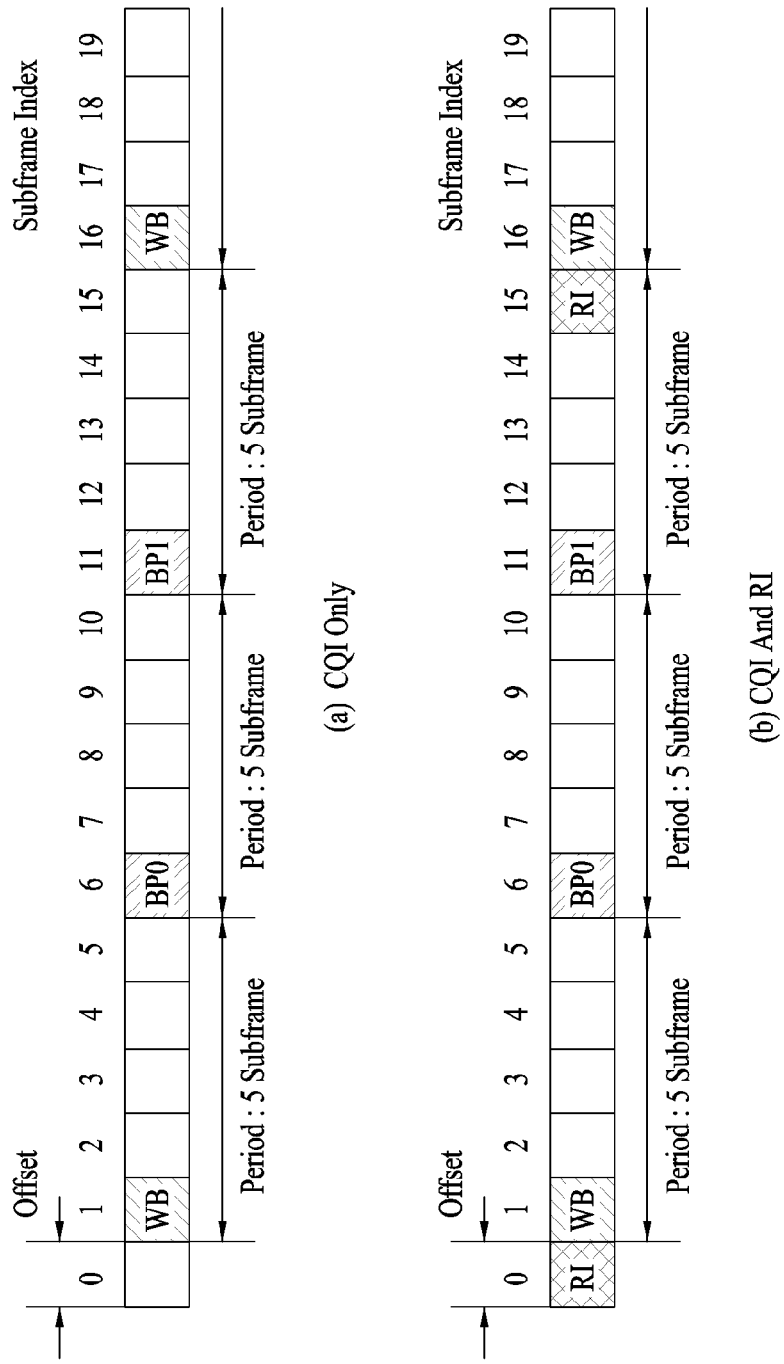

FIG. 10 is a diagram illustrating an exemplary system having a system band with 16 RBs. In this case, it is assumed that the system band includes two bandwidth parts (BPs) BP0 and BP1 which each include two subbands SB0 and SB1 which each include four RBs. This assumption is purely exemplary for explanation. The number BPs and the size of each SB may vary according to the size of the system band. In addition, the number of SBs included in each BP may vary according to the number of RBs, the number of BPs, and the size of SB.

In case of the type for transmission both WB CQI and SB CQI, WB CQI is transmitted in a first CQI transmission subframe, and CQI about an SB having a better channel state from SB0 and SB1, belonging to BP0, and an index (e.g., a subband selection indicator (SSI) corresponding to the corresponding SB are transmitted in a next CQI transmission subframe. Then, CQI about an SB having a better channel state from SB0 and SB1, belonging to BP1, and an index corresponding to the corresponding SB is transmitted in a next transmission subframe. Likewise, after WB CQI is transmitted, CQI information about BPs is sequentially transmitted. CQI information about each BP between two WB CQIs may be sequentially transmitted once to four times. For example, when CQI information about each BP between two WB CQIs is sequentially transmitted once, CQI information may be transmitted in an order of WB CQI⇒BP0 CQI⇒BP1 CQI⇒WB CQI. In addition, when CQI information about each BP between two WB CQIs is sequentially transmitted four times, CQI information may be transmitted in an order of WB CQI⇒BP0 CQI⇒BP1 CQI⇒BP0 CQI⇒BP1 CQI⇒BP0 CQI⇒BP1 CQI⇒BP0 CQI⇒BP1 CQI⇒WB CQI. Information about a number of times that each BP CQI is sequentially transmitted is signaled in an upper layer (e.g., an RRC layer).

FIG. 11(a) is a diagram illustrating an example in which a UE transmits both WB CQI and SB CQI when information indicating {period '5' and offset '1'} is signaled to the UE. Referring to FIG. 11(a), CQI may be transmitted in only a subframe corresponding to signaled period and offset irrespective a type of CQI.

FIG. 11(b) illustrates a case in which RI is additionally transmitted in a case of FIG. 11(a). RI may be signaled from an upper layer (e.g., an RRC layer) via a combination of a multiple of WB CQI transmission period and offset in the corresponding transmission period. Offset of RI is signaled as a relative value based on offset of CQI. For example, when the offset of CQI is '1' and the offset of RI is '0', RI may have the same offset as CQI. The offset of RI is defined as 0 and a negative value. In detail, FIG. 11(b) assumes a case in which a RI transmission period is one time of a WB CQI transmission period and the offset of RI is '−1' in the same environment as in FIG. 11(a). Since the RI transmission period is one time of the WB CQI transmission period, transmission periods of CSI are actually the same. Since the offset of RI is '−1', RI is transmitted based on '−1' (that is, subframe #0) with respect to offset '1' of CQI in FIG. 11(a). When the offset of RI is '0', transmission subframes of WB CQI and RI overlap each other. In this case, WB CQI is dropped and RI is transmitted.

Figure 12:
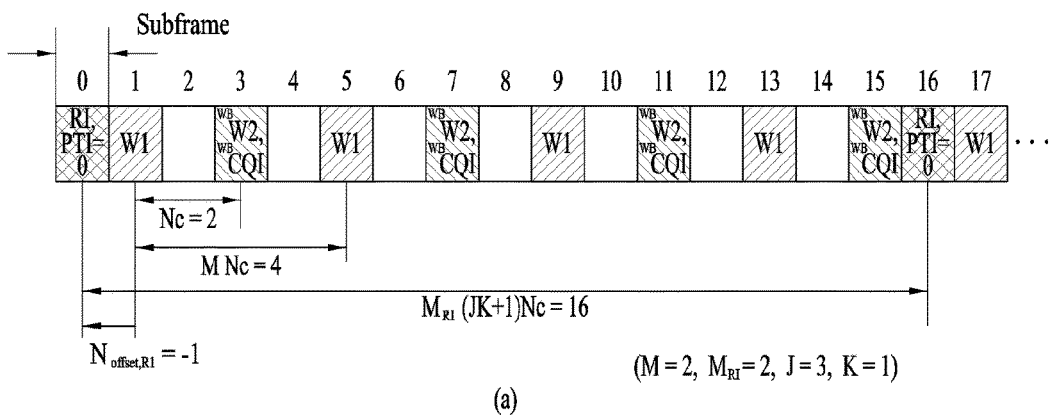
FIG. 12 is a diagram for a periodic reporting of channel state information currently discussed in LTE-A system.
Figure 12:
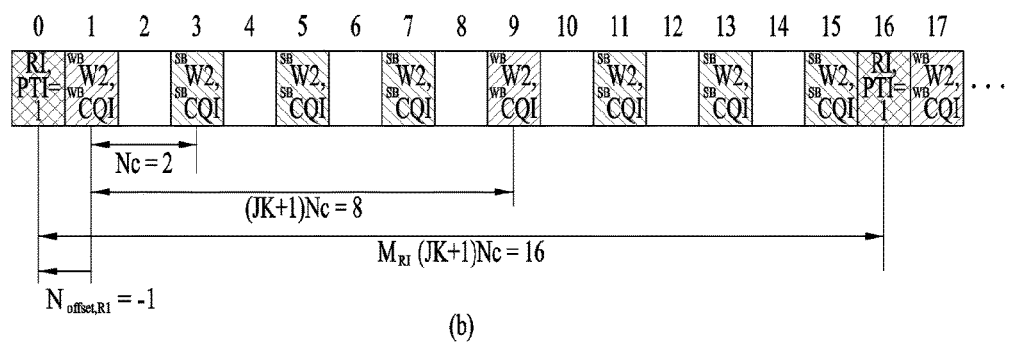
Figure 12:
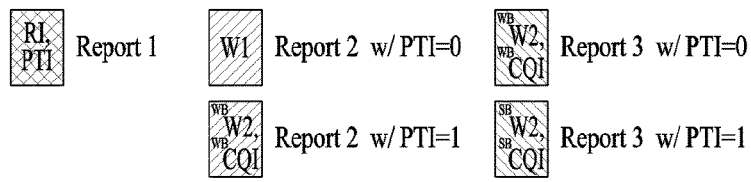

FIG. 12 is a diagram for an example of a periodic reporting of channel state information currently discussed in LTE-A system. When a base station has 8 transmission antennas, in case of a mode 2-1, a PTI (precoder type indication) parameter corresponding to a 1-bit indicator is configured. In this case, as shown in FIG. 12, it may consider a segmentalized periodic reporting mode of two types according to a PTI value. In the drawing, W1 and W2 indicate a hierarchical codebook mentioned earlier with reference to Equation 8 to 9. A precoding matrix W of a completed form is determined in a manner of combining the W1 and the W2 with each other only when both the W1 and the W2 are determined.

Referring to FIG. 12, in case of a periodic reporting, reports of which contents are different from each other corresponding to a report 1, a report 2 and a report 3 are reported according to repetition interval different from each other. The report 1 reports an RI and a 1-bit PTI value. The report 2 reports WB (wideband) W1 (PTI=0) or WB W2 and WB CQI (PTI=1). The report 3 reports WB W2 and WB CQI (PTI=0) or SB (subband) W2 and SB CQI (PTI=1).

The report 2 and the report 3 are transmitted in a subframe (for clarity, a first subframe set) where a subframe index satisfies (10*nf+floor(ns/2)−Noffset,CQI) mode (N$_c$)=0. The Noffset,CQI corresponds to an offset for transmitting PMI/CQI mentioned earlier in the example of FIG. 9. And, the N$_c$ corresponds to a subframe spacing between the report 2 and the report 3 adjacent to each other. FIG. 12 shows an example for a case that the CQI corresponds to 1 and the N$_c$ corresponds to 2 and the first subframe set consists of subframes including an add number index. The of indicates a system frame number (or radio frame index) and the ns indicates a slot index in a radio frame. The floor( ) indicates a descending function and the A mode B indicates a remainder resulted from dividing A by B.

The report 2 is located on a partial subframe of the first subframe set and the report 3 is located on the remaining subframes. Specifically, the report 2 is located on a subframe where a subframe index satisfies (10*nf+floor(ns/2)−Noffset,CQI) mode (H*N$_c$)=0. Hence, the report 2 is transmitted in every interval of H*N$_c$ and one or more first subframes positioned between adjacent reports 2 are filled with transmission of the report 3. If PTI corresponds to 0, H corresponds to M and the M is determined by higher layer signaling. FIG. 12 shows an example for a case that the M corresponds to 2. If the PTI corresponds to 1, the H corresponds to J*K+1. In this case, the K is determined by higher layer signaling and the J corresponds to the number of BP (bandwidth part). FIG. 12 shows an example for a case that the J corresponds to 3 and the K corresponds to 1.

The report 1 is transmitted in a subframe where a subframe index satisfies (10*nf+floor(ns/2)−Noffset,CQI−Noffset,RI) mod (MRI*(J*K+1)*Nc)=0 and the MRI is determined by higher layer signaling. The Noffset,RI indicates a relative offset value for the RI. FIG. 12 shows an example for a case that the MRI corresponds to 2 and the Noffset,RI corresponds to −1. With the help of the Noffset,RI=−1, a transmission point of the report 1 and a transmission point of the report 2 are not overlapped with each other. When a user equipment calculates RI, W1 and W2 value, those values are calculated in a manner of being associated with each other. For example, the W1 and the W2 are calculated in a manner of being dependent on the RI value and the W2 is calculated in a manner of being dependent on the W1. When the report 1, the report 2 and the report 3 are all reported, a base station is able to know a final W from the W1 and the W2.

Figure 13:
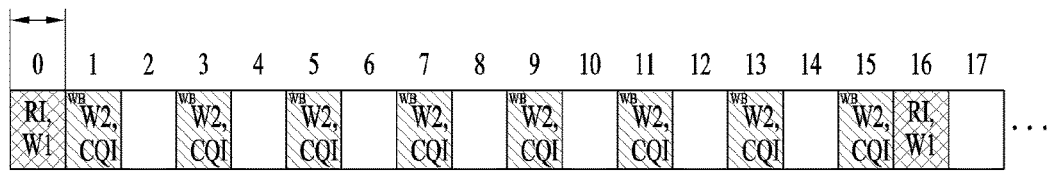
FIG. 13 is a diagram for an example of CSI feedback performed in a submode 1 of a mode 1-1 shown in FIG. 8.
Figure 13:
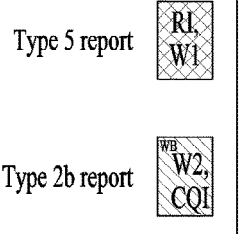

FIG. 13 is a diagram for an example of CSI feedback performed in a submode 1 of a mode 1-1 shown in FIG. 8.

In case of using a dual codebook, a PUCCH feedback mode 1-1 includes a submode 1 and a submode 2. FIG. 13 shows an example for the submode 1. WB (wideband) W2 and WB CQI are configured by an offset of 1 and a period of 2. An RI and W1 are configured by an offset of 0 and a period of 16.

In case of 8Tx codebook, as shown in Table 1 in the following, the RI and the W1 are jointly encoded by 5 bits. In this case, the W1 is subsampled as shown in Table 1. The subsampling is performed to report information with a low coding rate in a manner of reducing a payload size of the RI and the W1. Since the RI corresponds to a value to which the PMI and the CQI refer, it is necessary to encode the RI with a low coding rate in order to make a decoding error not occur on an RI value.

TABLE 1

| hypotheses | RI | values |
|---|---|---|
| 0-7 | 1 | {0, 2, 4, 6, 8, 10, 12, 14} |
| 8-15 | 2 | {0, 2, 4, 6, 8, 10, 12, 14} |
| 16-17 | 3 | {0, 2} |
| 18-19 | 4 | {0, 2} |
| 20-21 | 5 | {0, 2} |
| 22-23 | 6 | {0, 2} |
| 24-25 | 7 | {0, 2} |
| 26 | 8 | {0} |
| 27-31 | reserved | NA |

Figure 14:
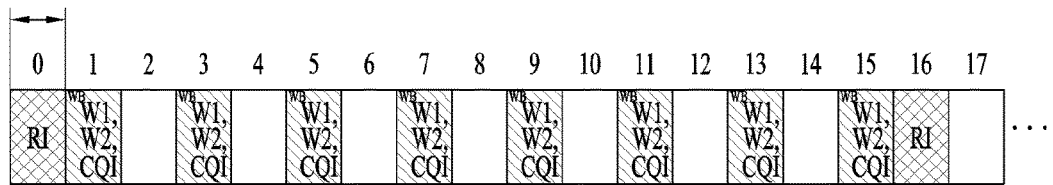
FIG. 14 is a diagram for an example of CSI feedback performed in a submode 2 of a mode 1-1 shown in FIG. 8.
Figure 14:
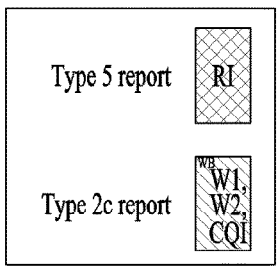

FIG. 14 is a diagram for an example of CSI feedback performed in a submode 2 of a mode 1-1 shown in FIG. 8.

As mentioned in the foregoing description, in case of using a dual codebook structure, a PUCCH feedback mode 1-1 includes a submode 1 and a submode 2. FIG. 14 shows an example for the submode 2. WB W1/W2 and WB CQI are configured by an offset of 1 and a period of 2. An RI is configured by an offset of 0 and a period of 16.

CSI information is reported to a base station via a PUCCH format 2. In particular, the CSI information can be transmitted within 11 bits corresponding to a payload size of the PUCCH format 2. Hence, it is necessary to subsample a codebook in a manner that a payload of a type 2c does not exceed total 11 bits. To this end, W1 and W2 are subsampled as shown in Table 2 in the following in 8Tx codebook and the W1 and the W2 are reported to the type 2c.

TABLE 2

| | PMI for W1 | | PMI for W2 | | total |
|---|---|---|---|---|---|
| RI | #bits | values | #bits | values | #bits |
| 1 | 3 | {0, 2, 4, 6, 8, 10, 12, 14} | 1 | {0, 2} | 4 |
| 2 | 3 | {0, 2, 4, 6, 8, 10, 12, 14} | 1 | {0, 1} | 4 |
| 3 | 1 | {0, 2} | 3 | {0, 1, 2, 3, 8, 9, 10, 11} | 4 |
| 4 | 1 | {0, 1} | 3 | {0, 1, 2, 3, 4, 5, 6, 7} | 4 |
| 5 | 2 | {0, 1, 2, 3} | 0 | {0} | 2 |
| 6 | 2 | {0, 1, 2, 3} | 0 | {0} | 2 |
| 7 | 2 | {0, 1, 2, 3} | 0 | {0} | 2 |
| 8 | 0 | {0} | 0 | {0} | 0 |

8 Tx W1 for a rank 1 and 8Tx W1 for a rank 2 are identical to each other. And, $i^{th}$ PMI of the W1 and $i+i^{th}$ PMI of the W1 shares two overlapped DFT vectors with each other. It is able to more precisely feedback a channel in a manner of making two DFT vectors to be overlapped with each other between adjacent PMIs. Yet, due to a limited PUCCH resource, as shown in Table 2, PMI of the W1 can be subsampled in a manner of restricting to PMIs of the W1 of even numbers. Although overlapped DFT vectors do not exist between PMIs of even numbers, since a UE is still able to represent total 32 DFT vectors using the subsampled W1, the aforementioned method corresponds to a subsampling method capable of minimizing performance degradation.

Figure 15:
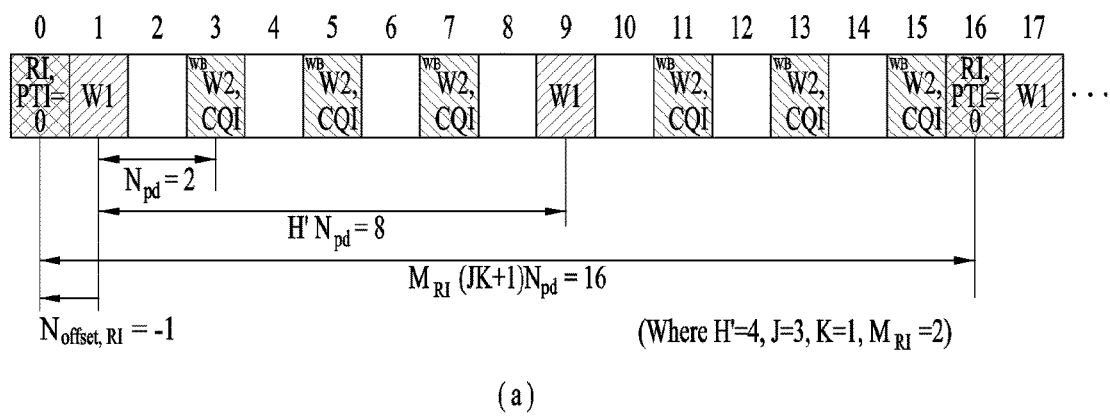
FIG. 15 is a diagram for an example of CSI feedback performed in a mode 2-1 shown in FIG. 8.
Figure 15:
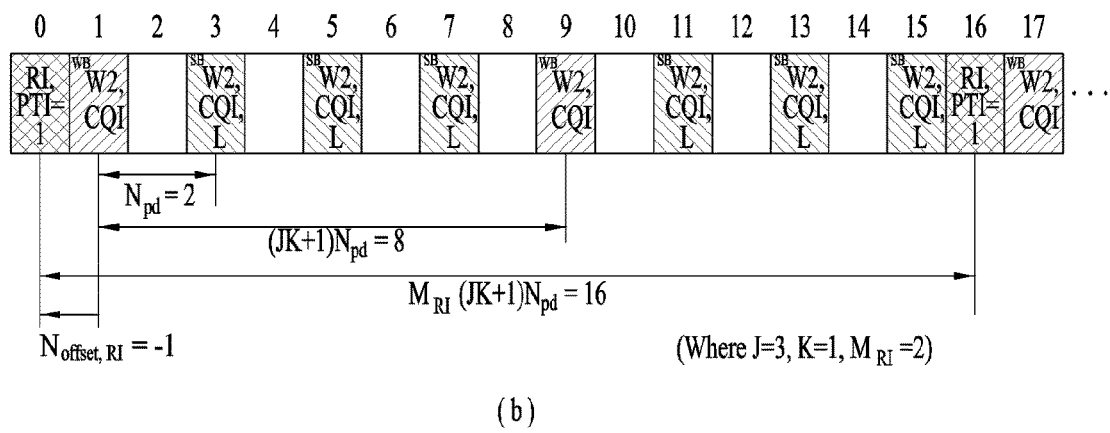

FIG. 15 is a diagram for an example of CSI feedback performed in a mode 2-1 shown in FIG. 8.

In case of using a dual codebook structure, a PUCCH feedback mode 2-1 is defined by two types according to a PTI value. FIG. 15 (a) shows an example when the PTI value corresponds to 0 and FIG. 15 (b) shows an example when the PTI value corresponds to 1. Referring to FIG. 15 (a), a wideband W1 is reported with a period of 8 subframes in a PUCCH feedback resource, which is opened with an offset of 1 and a period of 2, and a wideband W2 and CQI are reported in remaining subframes. An RI and PTI are configured by a period of 16 and an offset of 0. In FIG. 15 (b), if PTI is configured by 1, L bit information indicating a subband W2, a subband CQI and a subband index is reported.

In FIG. 15 (b), 8Tx codebook W2 is subsampled in a type 1a report reporting the L bit information indicating the subband W2, the subband CQI and the subband index subsamples as shown in Table 3 in the following. Through the subsampling, it is able to transmit information within 11 bits corresponding to a size of a payload of a PUCCH format 2. In Table 2, a W2 codeword of a rank 2 reports 0, 2, 4 and 6 only. The values play a role in generating a final codebook in a manner of selecting a single beam from a beam group constructing a W1. For example, when the W1 is configured as Equation in the following, if a codeword 0 of the W2 is selected, a final codebook W is determined as $$W = \begin{bmatrix} w_{11} & w_{11} \\ w_{11} & -w_{11} \end{bmatrix}$$

using $w_{11}$ only. In Equation 11, $w_{11}, w_{12}, w_{13}, w_{14}$ indicates a 4×1 column vector.

$$W1 = \begin{bmatrix} [w_{11}w_{12}w_{13}w_{14}] & 0 \\ 0 & [w_{11}w_{12}w_{13}w_{14}] \end{bmatrix} \quad \text{[Equation 11]}$$

Similarly, if a codeword 2 of the W2 is selected, the final codebook W is determined using $w_{12}$ only. If a codeword 4 of the W2 is selected, the final codebook W is determined using $w_{13}$ only. If a codeword 6 of the W2 is selected, the final codebook W is determined using $w_{14}$ only.

Table 3 in the following shows codebook subsampling in PUCCH mode 2-1. Mod indicates a modular operation.

TABLE 3

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

A CSI reporting type can be configured by one of various types. For example, a CSI reporting type defined in LTE Rd-10 is described in the following. A type 1 reporting supports CQI feedback for UE selection sub-bands. A type 1a reporting supports narrowband CQI and second PMI feedback. A type 2, a type 2b and a type 2c reporting support wideband CQI and PMI feedback. A type 2a reporting supports wideband PMI feedback. A type 3 reporting supports RI feedback. A type 4 reporting supports wideband CQI. A type 5 reporting supports RI and wideband PMI feedback. A type 6 reporting supports RI and PTI feedback.

Enhanced 4Tx Codebook

A 4Tx codebook can be represented by multiplication of two matrixes as shown in the following.

$$W = W_1 \cdot W_2 \quad \text{[Equation 12]}$$

In this case, an inner precoder $W_1$ and an outer precoder $W_2$ indicate a wideband/long-term channel property and a narrowband/short-term channel property, respectively. The $W_1$ can be configured as follows.

$$W_1 = \begin{bmatrix} X_n & 0 \\ 0 & X_n \end{bmatrix}, n = 0, 1, \cdots, 15 \quad \text{[Equation 13]}$$

In this case, $X_n$ can be configured as follows.

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32} \quad \text{[Equation 53]}$$

A codebook $W_2$ for rank 1 can be configured as follows.

$$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \right.$$ [Equation 14]
$$\left. \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

$Y = e_i \in \{e_1, e_2, e_3, e_4\}$ and $\alpha(i) = q_1^{2(i-1)}$

And, a codebook for rank 2 can be configured as follows.

$$W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$$ [Equation 15]

$(Y_1, Y_2) = (e_i, e_k) \in \{(e_1, e_1), (e_2, e_2), (e_3, e_3),$
$(e_4, e_4), (e_1, e_2), (e_2, e_3), (e_1, e_4), (e_2, e_4)\}$

In this case, $e_n$ corresponds to a 4-element selecting vector of which an $n^{th}$ element has a value of 1 and all remaining elements have values of 0.

In Equation 14, W2 has a form that two Y vectors are vertically concatenated. In this case, it is able to compensate for phase rotation between a horizontal beam group and a vertical beam group in X-pol antenna in a manner of multiplying a lower Y vector by one selected from the group consisting of 1, −1, j, and −j. In general, 1, −1, j and −j are commonly called a co-phasor factor. Similarly, in Equation 15, it may also consider (1, −1) and (j, −j) as the co-phasor factor.

In the following, an index of W1 is defined as i1. The i1 is identical to a value of an index n of W1 in equation of the aforementioned 4Tx codebook.

And, an index of W2 is defined as shown in Table 4 in the following.

TABLE 4

| Index of W2 | W2 for rank 1 | W2 for rank 2 |
|---|---|---|
| 0 | $\frac{1}{\sqrt{2}} \begin{bmatrix} e_1 \\ q_1^0 e_1 \end{bmatrix}$ | $\frac{1}{2} \begin{bmatrix} e_1 & e_1 \\ e_1 & -e_1 \end{bmatrix}$ |
| 1 | $\frac{1}{\sqrt{2}} \begin{bmatrix} e_1 \\ jq_1^0 e_1 \end{bmatrix}$ | $\frac{1}{2} \begin{bmatrix} e_1 & e_1 \\ je_1 & -je_1 \end{bmatrix}$ |
| 2 | $\frac{1}{\sqrt{2}} \begin{bmatrix} e_1 \\ -q_1^0 e_1 \end{bmatrix}$ | $\frac{1}{2} \begin{bmatrix} e_2 & e_2 \\ e_2 & -e_2 \end{bmatrix}$ |
| 3 | $\frac{1}{\sqrt{2}} \begin{bmatrix} e_1 \\ -jq_1^0 e_1 \end{bmatrix}$ | $\frac{1}{2} \begin{bmatrix} e_2 & e_2 \\ je_2 & -je_2 \end{bmatrix}$ |
| 4 | $\frac{1}{\sqrt{2}} \begin{bmatrix} e_2 \\ q_1^2 e_2 \end{bmatrix}$ | $\frac{1}{2} \begin{bmatrix} e_3 & e_3 \\ e_3 & -e_3 \end{bmatrix}$ |
| 5 | $\frac{1}{\sqrt{2}} \begin{bmatrix} e_2 \\ jq_1^2 e_2 \end{bmatrix}$ | $\frac{1}{2} \begin{bmatrix} e_3 & e_3 \\ je_3 & -je_3 \end{bmatrix}$ |
| 6 | $\frac{1}{\sqrt{2}} \begin{bmatrix} e_2 \\ -q_1^2 e_2 \end{bmatrix}$ | $\frac{1}{2} \begin{bmatrix} e_4 & e_4 \\ e_4 & -e_4 \end{bmatrix}$ |
| 7 | $\frac{1}{\sqrt{2}} \begin{bmatrix} e_2 \\ -jq_1^2 e_2 \end{bmatrix}$ | $\frac{1}{2} \begin{bmatrix} e_4 & e_4 \\ je_4 & -je_4 \end{bmatrix}$ |
| 8 | $\frac{1}{\sqrt{2}} \begin{bmatrix} e_3 \\ q_1^4 e_3 \end{bmatrix}$ | $\frac{1}{2} \begin{bmatrix} e_1 & e_2 \\ e_1 & -e_2 \end{bmatrix}$ |
| 9 | $\frac{1}{\sqrt{2}} \begin{bmatrix} e_3 \\ jq_1^4 e_3 \end{bmatrix}$ | $\frac{1}{2} \begin{bmatrix} e_1 & e_2 \\ je_1 & -je_2 \end{bmatrix}$ |
| 10 | $\frac{1}{\sqrt{2}} \begin{bmatrix} e_3 \\ -q_1^4 e_3 \end{bmatrix}$ | $\frac{1}{2} \begin{bmatrix} e_2 & e_3 \\ e_2 & -e_3 \end{bmatrix}$ |
| 11 | $\frac{1}{\sqrt{2}} \begin{bmatrix} e_3 \\ -jq_1^4 e_3 \end{bmatrix}$ | $\frac{1}{2} \begin{bmatrix} e_2 & e_3 \\ je_2 & -je_3 \end{bmatrix}$ |
| 12 | $\frac{1}{\sqrt{2}} \begin{bmatrix} e_4 \\ q_1^6 e_4 \end{bmatrix}$ | $\frac{1}{2} \begin{bmatrix} e_1 & e_4 \\ e_1 & -e_4 \end{bmatrix}$ |
| 13 | $\frac{1}{\sqrt{2}} \begin{bmatrix} e_4 \\ jq_1^6 e_4 \end{bmatrix}$ | $\frac{1}{2} \begin{bmatrix} e_1 & e_4 \\ je_1 & -je_4 \end{bmatrix}$ |
| 14 | $\frac{1}{\sqrt{2}} \begin{bmatrix} e_4 \\ -q_1^6 e_4 \end{bmatrix}$ | $\frac{1}{2} \begin{bmatrix} e_2 & e_4 \\ e_2 & -e_4 \end{bmatrix}$ |
| 15 | $\frac{1}{\sqrt{2}} \begin{bmatrix} e_4 \\ -jq_1^6 e_4 \end{bmatrix}$ | $\frac{1}{2} \begin{bmatrix} e_2 & e_4 \\ je_2 & -je_4 \end{bmatrix}$ |

Codebook Subsampling

When a UE makes a feedback on the enhanced codebook, the UE jointly encodes an RI and W1 in a submode 1 of PUCCH CSI feedback mode 1-1 to makes the feedback on the enhanced codebook. In this case, the UE subsamples a codebook for PUCCH coverage and jointly encodes a partial subsampled codeword with the RI.

For example, a UE of which a maximum rank corresponds to 2 and a UE of which a maximum rank corresponds to 4 make a feedback on CSI via Table 5 and Table 6, respectively. A UE is able to know a maximum rank of the UE by supported MIMO capability of the UE for a specific serving cell and a minimum value of the number of configured RS ports.

TABLE 5

| hypotheses | RI | PMI for $W_1$ |
|---|---|---|
| 0-7 | 1 | {0, 1, 2, 3, 4, 5, 6, 7} |
| 8-15 | 2 | {0, 1, 2, 3, 4, 5, 6, 7} |

TABLE 6

| hypotheses | RI | PMI for $W_1$ |
|---|---|---|
| 0-15 | 1 | {0 to 15} |
| 16-23 | 2 | {0, 1, 2, 3, 4, 5, 6, 7} |
| 24 | 3 | None ($W_1$ is a identity matrix) |
| 25 | 4 | None ($W_1$ is a identity matrix) |

Capability Information Element of UE

LTE system, e.g., LTE-release 10 system, can representatively use a CA (carrier aggregation) and a higher layer MIMO technology to enhance performance. A UE supporting the LTE system can support CA and MIMO SDMA (spatial division multiple access) and the UE can be classified into a UE of high level capability and a UE of low level capability according to the extent of supporting. In order to transmit information on capability of a UE to a base station, it may use a UE capability information element including various fields containing a UE category.

A UE may have MIMO capability different from each other depending on a bandwidth, a band, or a band combination. For example, a UE may be able to perform a CA operation with a serving cell 2 of a bandwidth class A, which is non-contiguously separated from a serving cell 1 of the bandwidth class A on a same band (i.e., band 2). In this case, a maximum rank capable of being received from the serving cell 1 and the serving cell 2 can be differently configured. As mentioned in the foregoing description, it is able to define a supportedMIMO-CapabilityDL field in the UE capability IE to configure MIMO capability different from each other according to a bandwidth, a band or a band combination.

Yet, if a UE performs CA for a plurality of non-contiguous bandwidths using a same band and a maximum rank of each of a plurality of bandwidths is differently configured, it is difficult for the UE or an eNB to clearly know a serving cell and a maximum rank mapped to each other.

Figure 16:
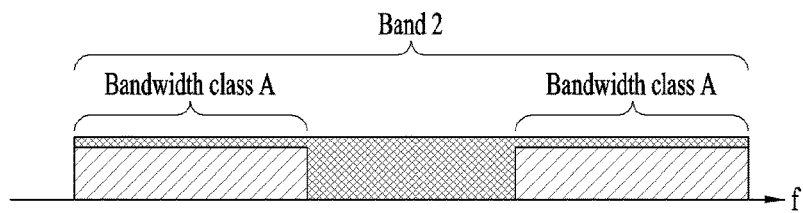
FIG. 16 is a diagram for a band combination (2A, 2A) in intra-band which is non-contiguous in band 2.

As shown in FIG. 16, when a specific UE has MIMO capability of which maximum number of supported layers corresponds to 2 and MIMO capability of which maximum number of supported layers corresponds to 4 for non-contiguous intra-band band combination (2A, 2A), respectively, the aforementioned rank mapping problem occurs.

In this case, when a UE and an eNB encode/decode CSI feedback information, a critical problem may occur. This is because, since the UE determines an encoding table on the basis of a maximum layer defined in MIMO capability of the UE and the number of configured RS ports and performs joint encoding on an RI and W1 to make a type 5 report, it is ambiguous for the UE which MIMO capability is to be applied to a band 2A corresponding to current feedback information. Due to the ambiguity, if the UE and the eNB perform encoding/decoding by applying an RI+W1 joint encoding table different from each other, the eNB is unable to properly receive an RI+W1 value.

For example, the UE can encode CSI via Table 2 in a manner of assuming a maximum rank 4 for a CC (CC 0) having a low center frequency and encode CSI via Table 1 in a manner of assuming a maximum rank 2 for a CC (CC 1) having a high center frequency. As a result, assume that the UE made a feedback on hypothesis 8 (rank=1, W1=8) and a hypothesis 9 (rank=2, W1=1) for the CC 0 and the CC 1, respectively. On the contrary, if the eNB assumes rank 2 and 4 for the CC0 and the CC 1, respectively, the eNB interprets CSI with an incorrect value. In particular, although the UE made a feedback on rank=1 and W1=8 for the CC 0, the eNB interprets it as rank=2 and W1=0.

Although FIG. 16 shows an example for a case that two class As exist on a band 2, characteristics of the present invention described in the following can also be applied to a case that a plurality of classes exist on a random band.

Method of Subsampling According to the Present Invention

In order to solve the aforementioned problem, it is able to apply a method of configuring a common hypothesis between an RI+W1 joint encoding table used in maximum 2 layers and an RI+W1 joint encoding table used in maximum 4 layers according to the present invention.

When Table 5 and Table 6 are compared with each other, it is able to know that two tables show an identical RI and W1 in hypothesis 0 to 7. Hence, although a UE makes a feedback on values between hypothesis 0 and 7 for two CCs (component carriers), the eNB can decode the values without any problem. For example, although the UE makes a feedback on hypothesis 1 (rank=1, W1=0) by assuming maximum rank 2 on a CC 0 and makes feedback on hypothesis 1 (rank=1, W1=1) by assuming maximum rank 4 on a CC1, the eNB can decode the values with no problem. This is because, although the eNB decodes a value by assuming maximum rank 4 on the CC 0, hypothesis 0 still indicates (rank=1, W1=0). Similarly, although the eNB decodes a value by assuming maximum rank 2 on the CC 1, hypothesis 1 still indicates (rank=1, W1=0).

Yet, in hypothesis 8 to 15, RI and W1 shown in two tables are different from each other. For example, although hypothesis 8 indicates rank=2 and W1=0 in Table 5, the hypothesis 8 indicates rank=1 and W1=8 in Table 6. As a result, if an eNB and a UE assume a maximum rank different from each other on a same CC, a problem described in the following may occur.

Although the UE assumes a maximum rank 4 on the CC 0 and encodes hypothesis 8 of which rank=1 and W1=8 using Table 6, the eNB assumes a maximum rank 2 on the CC 0 and decodes the hypothesis 8 by rank=2 and W1=0 using Table 5.

In order to solve the aforementioned problem, it is preferable to change tables to make the RI and the W1 value shown in two tables to be the same in hypothesis 8 to 15.

For example, it is preferable to change Table 6 into Table 7 in the following. The RI and the W1 corresponding to all hypotheses 0 to 15 shown in Table 5 are matched with RI and W1 corresponding to hypothesis 0 to 15 shown in Table 7. Hence, although the UE encodes a type 5 report using Table 5 and the eNB decodes the type 5 report using Table 7, it is able to properly decode RI and W1.

On the contrary, if the UE encodes the type 5 report using Table 7 and the eNB decodes the type 5 report using Table 5, a decoding result may vary according to an encoded hypothesis range. In particular, if the UE encodes one of the hypotheses 0 to 15, the eNB can properly perform decoding. On the contrary, if the UE encodes one of the remaining hypotheses, the eNB is unable to properly perform decoding. In this case, decoding fail occurs. The eNB can properly perform decoding in a manner of performing decoding again using Table 3.

TABLE 7

| hypotheses | RI | PMI for $W_1$ |
|---|---|---|
| 0-7 | 1 | {0, 1, 2, 3, 4, 5, 6, 7} |
| 8-15 | 2 | {0, 1, 2, 3, 4, 5, 6, 7} |
| 16-23 | 1 | {8, 9, 10, 11, 12, 13, 14, 15} |
| 24 | 3 | None ($W_1$ is a identity matrix) |
| 25 | 4 | None ($W_1$ is a identity matrix) |

In particular, the UE generates a type 5 report using Table 5 when a maximum rank corresponds to 2 and generates a type 5 report using Table 7 when a maximum rank corresponds to 4. In this case, although maximum rank interpretation is different from each other between the UE and the eNB, the base station can properly decode CSI in a manner of identically configuring RI and W1 corresponding to a common hypothesis between Table 5 and Table 7.

The aforementioned proposal can be identically applied to a general situation described in the following. Assume that a UE generates a type 5 report using Table X when a maximum rank corresponds to n and generates a CSI report using Table Y when a maximum rank corresponds to k (k>n). In this case, a hypothesis for a random CSI combination shown in Table X and a hypothesis for the random CSI combination shown in Table Y are identically configured.

Figure 17:
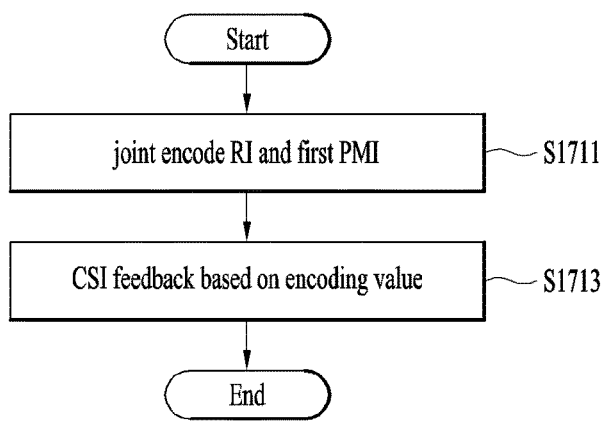
FIG. 17 is a flowchart for a method of reporting channel state information according to one embodiment of the present invention.

A method of reporting channel state information according to one embodiment of the present invention is explained with reference to FIG. 17.

In the step S171, a UE reports an RI and a first PMI together and performs joint encoding on the RI and the first PMI with a single encoding value in a reporting mode for 4 antenna ports.

Subsequently, in the step S173, the UE reports channel state information including the encoding value.

In this case, the encoding value is determined according to a first table or a second table depending on a maximum value of the RI. If a value of the encoding value according to the second table is identical to an encoding value according to the first table, the RI identically corresponds to the first PMI.

In particular, the first table corresponds to the aforementioned Table 5 and the second table corresponds to the aforementioned Table 7.

In case of performing a method of transmitting channel state information according to the present invention, items mentioned earlier in various embodiments of the present invention can be independently applied or two or more embodiments can be applied at the same time. For clarity, explanation on duplicated contents is omitted at this time.

And, the principle proposed by the present invention can be identically applied to MIMO transmission (in backhaul uplink and backhaul downlink) between a base station and a relay and uplink MIMO transmission and reception for MIMO transmission (in access uplink and access downlink) between a relay and a UE.

Figure 18:
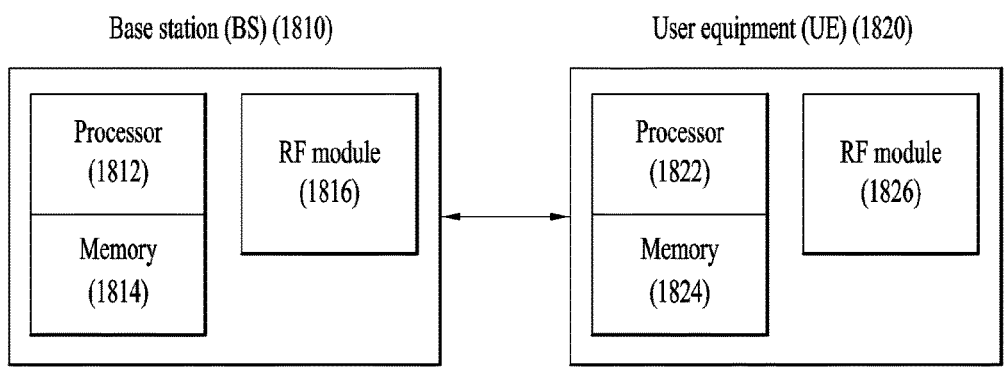
FIG. 18 is a diagram for a base station and a user equipment applicable to one embodiment of the present invention.

Base Station and User Equipment to which Embodiment of the Present Invention is Applicable FIG. 18 is a diagram for an example of a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 18, a wireless communication system includes a base station (BS) 1810 and a user equipment (UE) 1820. The BS 1810 includes a processor 1812, a memory 1814 and a radio frequency (RF) unit 1816. The processor 1812 can be configured to implement the proposed functions, processes and/or methods. The memory 1814 is connected with the processor 1812 and then stores various kinds of information associated with an operation of the processor 1812. The RF unit 1816 is connected with the processor 1812 and transmits and/or receives a radio signal. The user equipment 1820 includes a processor 1822, a memory 1824 and a radio frequency (RF) unit 1826. The processor 1822 can be configured to implement the proposed functions, processes and/or methods. The memory 1824 is connected with the processor 1822 and then stores various kinds of information associated with an operation of the processor 1822. The RF unit 1826 is connected with the processor 1822 and transmits and/or receives a radio signal. The base station 1810 and/or the user equipment 1820 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be used for such a wireless communication device as a user equipment, a relay, a base station and the like.

What is claimed is:

1. A method for transmitting channel state information by a user equipment in a wireless communication system, the method comprising:
receiving a configuration information related to the channel state information, and
transmitting the channel state information containing a encoding value based on the configuration information,
wherein a RI (rank indicator) and a first PMI (precoding matrix indicator) are joint encoded with the encoding value in a reporting mode for 4 antenna ports,
wherein the encoding value is determined according to a first table or a second table when the user equipment transmits signals using a plurality of non-contiguous bandwidths based on a CA (carrier aggregation),
wherein the first table corresponds to a first bandwidth included in the non-contiguous bandwidths and includes values corresponding to each combination of the RI and first PMI,
wherein the second table corresponds to a second bandwidth included in the non-contiguous bandwidths and includes values corresponding to each combination of the RI and the first PMI, and
wherein a first value included in the first table is identical to a second value included in the second table when the first value and second value correspond to a same combination of the RI and first PMI.

2. The method of claim 1, wherein a maximum value of the RI corresponds to 2 in the first table and wherein a maximum value of the RI corresponds to 4 in the second table.

3. The method of claim 2, wherein a value of the joint encoding is determined by a value of the first PMI when the RI corresponds to 1 and the first PMI corresponds to 0 to 7 in the first table.

4. The method of claim 2, wherein a value of the joint encoding is determined by a value obtained by adding 8 to a value of the first PMI when the RI corresponds to 1 and the first PMI corresponds to 0 to 7 in the first table.

5. The method of claim 2, wherein a value of the joint encoding is determined by a value of the first PMI when the RI corresponds to 1 and the first PMI corresponds to 0 to 7 in the second table.

6. The method of claim 2, wherein a value of the joint encoding is determined by a value obtained by adding 8 to a value of the first PMI when the RI corresponds to 2 and the first PMI corresponds to 0 to 7 in the second table.

7. The method of claim 2, wherein a value of the joint encoding is determined by a value obtained by adding 8 to a value of the first PMI when the RI corresponds to 1 and the first PMI corresponds to 8 to 15 in the second table.

8. A user equipment for transmitting channel state information in a wireless communication system, the user equipment comprising:
a RF (radio frequency) unit; and
a processor configures to control the RF unit,
wherein the processor is further configured to
receive a configuration information related to the channel state information, and
transmit the channel state information containing a encoding value based on the configuration information,
wherein a RI (rank indicator) and a first PMI (precoding matrix indicator) are joint encoded with the encoding value in a reporting mode for 4 antenna ports,
wherein the encoding value is determined according to a first table or a second table when the user equipment transmits signals using a plurality of non-contiguous bandwidths based on a CA (carrier aggregation),
wherein the first table corresponds to a first bandwidth included in the non-contiguous bandwidths and includes values corresponding to each combination of the RI and first PMI,
wherein the second table corresponds to a second bandwidth included in the non-contiguous bandwidths and includes values corresponding to each combination of the RI and the first PMI, and
wherein a first value included in the first table is identical to a second value included in the second table when the first value and second value correspond to a same combination of the RI and first PMI.

9. The user equipment of claim 8, wherein a maximum value of the RI corresponds to 2 in the first table and wherein a maximum value of the RI corresponds to 4 in the second table.

10. The user equipment of claim 9, wherein a value of the joint encoding is determined by a value of the first PMI when the RI corresponds to 1 and the first PMI corresponds to 0 to 7 in the first table.

11. The user equipment of claim 9, wherein a value of the joint encoding is determined by a value obtained by adding 8 to a value of the first PMI when the RI corresponds to 2 and the first PMI corresponds to 0 to 7 in the first table.

12. The user equipment of claim 9, wherein a value of the joint encoding is determined by a value of the first PMI when the RI corresponds to 1 and the first PMI corresponds to 0 to 7 in the second table.

13. The user equipment of claim 9, wherein a value of the joint encoding is determined by a value obtained by adding 8 to a value of the first PMI when the RI corresponds to 2 and the first PMI corresponds to 0 to 7 in the second table.

14. The user equipment of claim 9, wherein a value of the joint encoding is determined by a value obtained by adding 8 to a value of the first PMI when the RI corresponds to 1 and the first PMI corresponds to 8 to 15 in the second table.

* * * * *